Oct. 1, 1968  A. J. HIRST  3,403,638
RAILWAY VEHICLE SUSPENSION
Filed Dec. 31, 1964  5 Sheets-Sheet 1

INVENTOR
ARCHIE JOHN HIRST
BY
ATTORNEY

Oct. 1, 1968   A. J. HIRST   3,403,638
RAILWAY VEHICLE SUSPENSION
Filed Dec. 31, 1964   5 Sheets-Sheet 2

INVENTOR
ARCHIE JOHN HIRST
BY
Russell & Moore
ATTORNEY

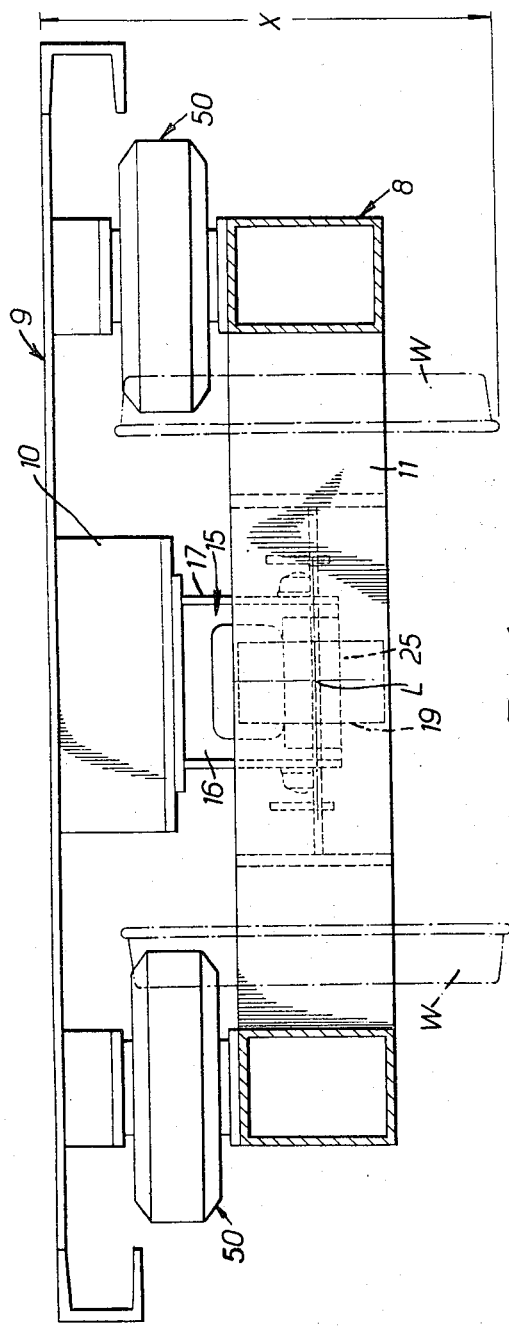

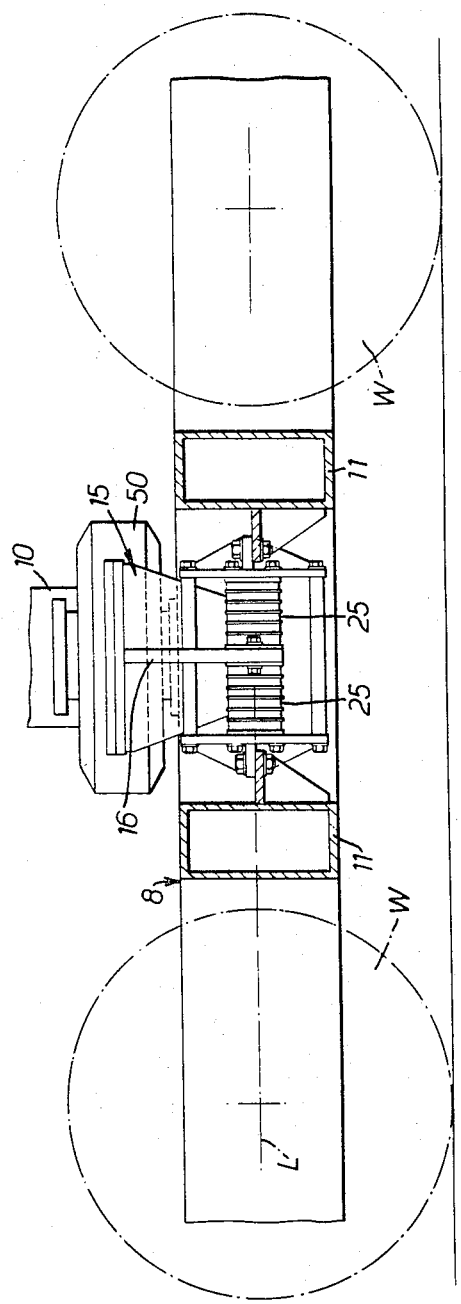

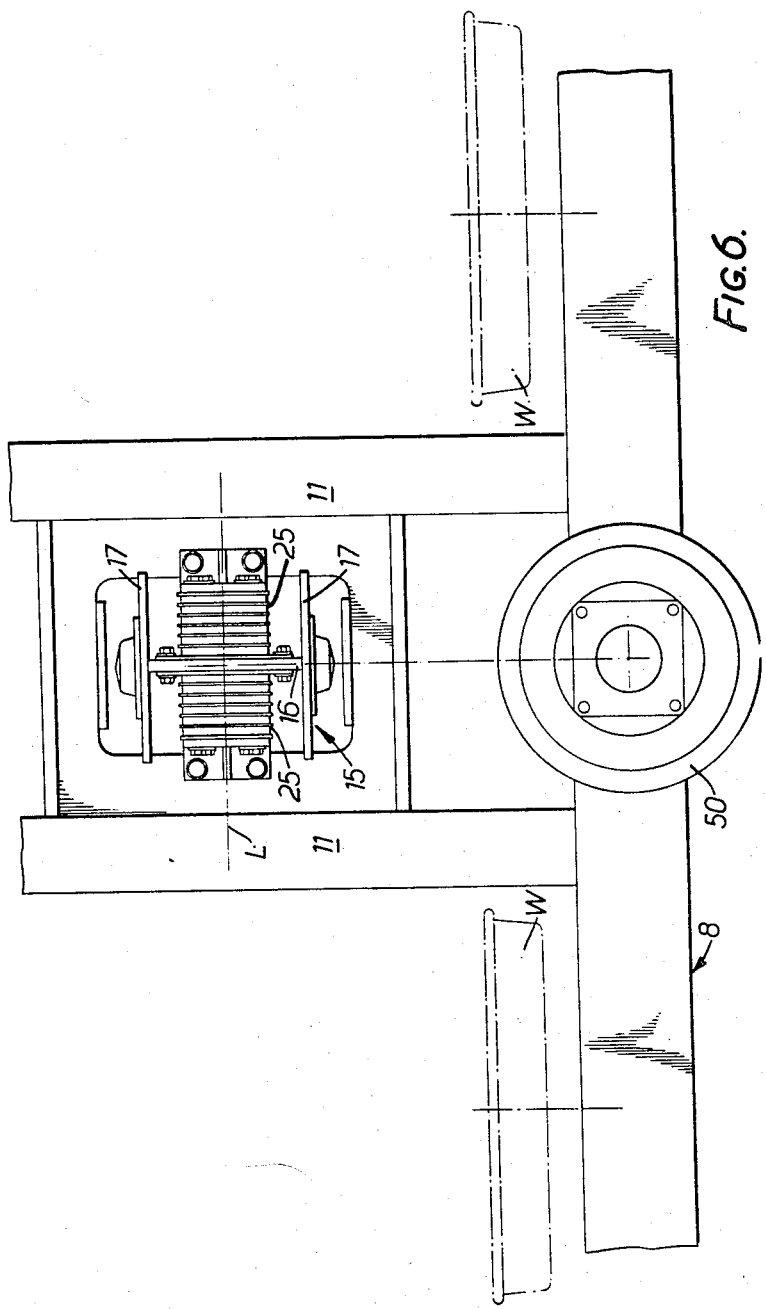

United States Patent Office 3,403,638
Patented Oct. 1, 1968

3,403,638
RAILWAY VEHICLE SUSPENSION
Archie John Hirst, Leicester, England, assignor to Metalastik Limited, Leicester, England, a British company
Filed Dec. 31, 1964, Ser. No. 422,701
Claims priority, application Great Britain, Jan. 3, 1964, 363/64
9 Claims. (Cl. 105—199)

ABSTRACT OF THE DISCLOSURE

A bolsterless bogie construction for a railway vehicle has side bearer assemblies which accommodate pivoting of the bogie with respect to the vehicle body and a central, rubber spring device for transmitting the longitudinal traction and braking forces between the body and the bogie in compression in the rubber. The rubber spring device is pre-compressed longitudinally so as to have very small, zero or negative stability vertically and may be used to modify both the vertical and the horizontal, transverse spring characteristics of the side bearer assemblies.

---

Figure 1:
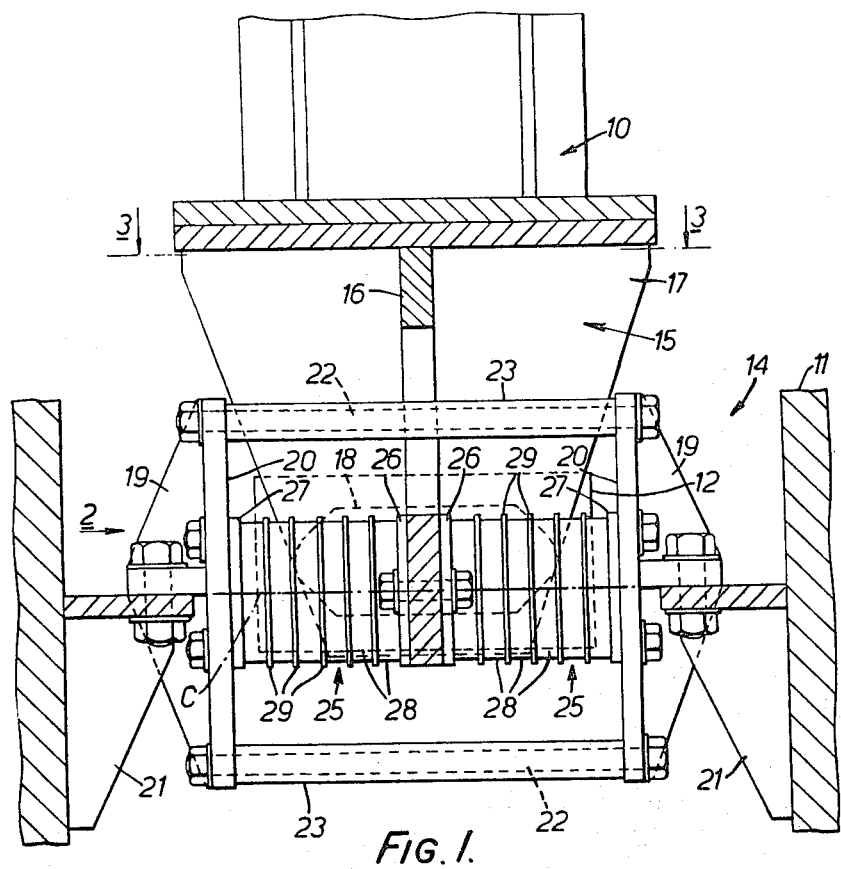

This invention relates to railway vehicles and is concerned with a control device which is used inter alia for transmitting the traction and braking forces between the body of a railway vehicle and a bogie of the vehicle, in vehicles having bolsterless bogies.

The device may be used additionally to modify the suspension characteristics with change of load of the vehicle as will hereinafter be explained.

In railway vehicles having bolsterless bogies, the whole or a large proportion of the weight of the vehicle body may be transmitted directly to the bogie frame by side bearers which accommodate pivoting of the bogie with respect to the vehicle when running round curves in the rail track. The pivot angle is usually quite small, not usually exceeding 7° on each side of the straight ahead position, and is conveniently accommodated in rubber spring side bearers by shear deformation of the rubber in horizontal planes. Because of the freedom which they allow for pivoting movement, the side bearers are unable to transmit the longitudinal forces acting between the vehicle body and the bogie and in consequence means has to be provided to transmit these forces between the body and the bogie and to locate them relatively to one another in the longitudinal direction of the vehicle, whilst at the same time permitting the relative pivoting movement.

According to the present invention there is provided a control device for this purpose comprising a pair of metal-interleaves rubber springs which in the normal straight ahead position of the bogie and under at least one predetermined vehicle loading condition lie with their compression axes in line along a longitudinal centre line of the vehicle one on each side of a central member to which the adjacent inner ends of the two springs are rigidly connected, the outer ends of the springs being rigidly connected to parts on the bogie frame and the central member being connected to or supporting the body or vice versa, with the springs held in precompression between said parts and the central member, the relative dimension of the springs and the number of metal interleaves in the springs being such and the precompression in the springs being sufficiently great that the control device has little or not positive vertical stiffness or a negative vertical stiffness but a high horizontal stiffness in the longitudinal fore and aft direction of the vehicle.

It is commonly known that a metal-interleaved rubber spring tends to become more and more unstable as the compression loading on the spring is increased, depending upon the height of the spring in relation to the length or width of the rubber pads and metal interleaves making up the spring. The instability leads to buckling of the spring and if the spring is loaded sufficiently to a condition in which it will buckle, the spring will even exert a negative stiffness in planes normal to the direction of loading. The working of a control device according to the present invention depends upon this tendency to instability. In such a control device, as defined above, the two interleaved rubber springs on each side of the central member together make up one long, unstable spring which is constrained centrally by the central member against buckling in directions normal to the direction of pre-compression. Due to this instability or buckling tendency the springs exert a very low vertical stiffness or a zero vertical stiffness or even a negative vertical stiffness if, for example, without the constraint of the central member, buckling would actually take place.

According to a preferred feature of the present invention the springs are composed of rubber pads and metal-interleaves which are, for example, rectangular in shape, the pads and interleaves having a greatest width dimension disposed in the horizontal transverse direction of the vehicle.

In this way it may be arranged that the control device has a useful transverse horizontal stiffness to assist in the control of side loads between the body and the bogie.

A control device according to the present invention finds particular application to a bolsterless bogie employing air-levelling side bearers to maintain for example the height of the vehicle body above the rail level at a predetermined value. In the construction just envisaged the vehicle body and the bogie frame remain substantially on the same level with respect to one another throughout the load range from tare load to full load, their relative vertical displacement over this load range being equal to the deflection of the axle box springs and accordingly small. If necessary or desired, the air levelling side bearers may alternatively maintain the vehicle body and the bogie frame on the same level with respect to one another.

A control device according to the present invention may however be used in non-levelling, bolsterless bogies. With a non-levelling bolsterless bogie construction there is of course a far greater range of vertical movement between the vehicle body and the bogie frame and consequently between the inner and outer ends of the springs of the centre device. Accordingly, the stiffness properties of the device in the vertical and transverse horizontal directions will alter with the load condition and advantage can be taken of this for example to increase the overall vertical stiffness of the body suspension with increase of vertical load.

Figure 2:
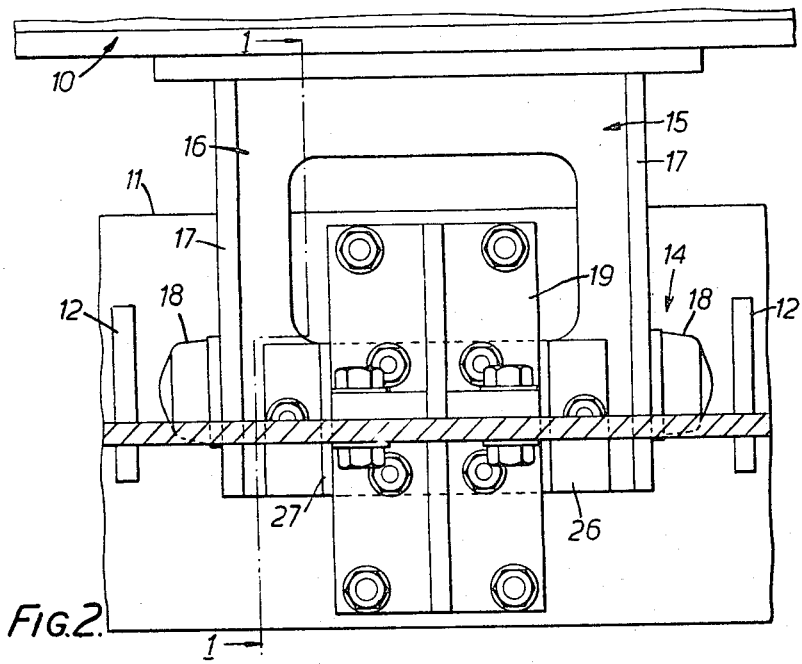
Figure 3:
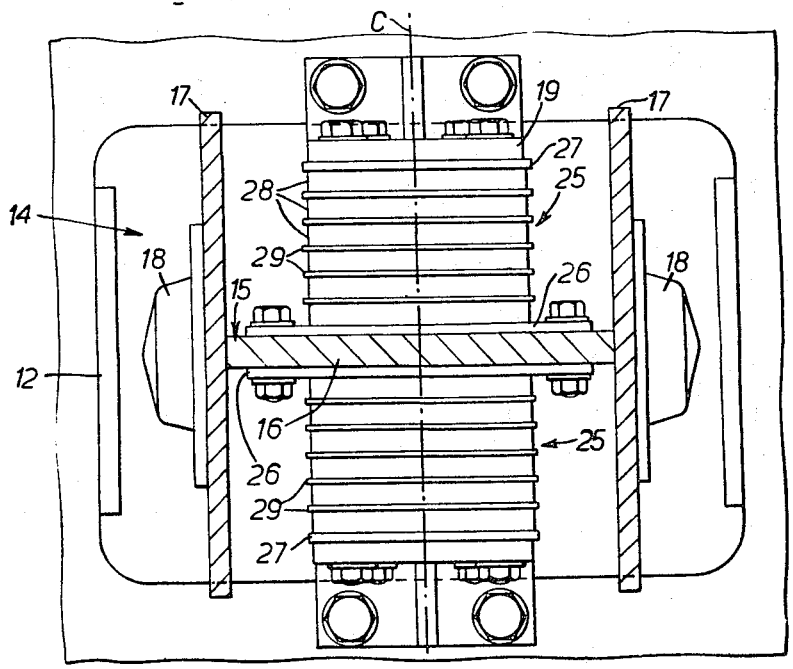

A specific embodiment of the present invention will now be described merely by way of example with reference to the accompanying drawings, in which:

FIG. 1 is a cross-sectional side elevation on line 1—1 in FIG. 2, of a control device according to the present invention, the device interconnecting the vehicle body and the bogie frame of a bolsterless bogie in a railway vehicle, FIG. 2 is an end view in the direction of arrow 2 in FIG. 1, FIG. 3 is a cross-sectional plan view on line 3—3 in FIG. 1, FIG. 4 is a diagrammatic end elevational view of a railway vehicle comprising the control device, FIG. 5 is a corresponding side sectional elevational view of the vehicle, and FIG. 6 is a corresponding plan view mainly to one side of the longitudinal axis of the vehicle.

Referring to the drawings, a body bolster forming part of the underframe of the vehicle body 9 is indicated at 10, a pair of longitudinally spaced transoms of the bogie frame 8, at 11, and a pair of transversely spaced longitudinally extending bogie frame members at 12, see FIG. 2, the transoms 11 and the frame members 12, together defining a central opening 14 in the bogie frame which houses the control device according to the invention.

A member 15 depends from the body bolster downwardly into the opening 14 so as to lie centrally in the opening in the normal, straight ahead position of the bogie that is to say when the longitudinal centre line of the body is disposed in the same vertical plane as the longitudinal centre line of the bogie.

The member 15 is of I-section and comprises a transverse web 16 and longitudinally extending flanges 17. Rubber buffers 18 are carried on the outside of the flanges 17 to engage the members 12 at the limit of the relative transverse displacement of the member 15, and therefore the vehicle body, and the members 12, and therefore the bogie frame.

Bolted to bracket supports 21 on the transoms 11 is a pair of longitudinally spaced end members 19 presenting transverse vertical interfacing load transmitting surfaces 20. The end members are united with one another by means of four longitudinally extending connecting bolts 22 carrying spacer sleeves 23 which maintain the interfacing surfaces 20 in a fixed spaced relation prior to the assembly of the control device on the bogie frame for the purpose hereinafter described.

A pair of metal-interleaved rubber springs 25 comprising inner and outer metal end plates 26, 27 and alternate rubber pads 28 and metal interleaves 29 all surface bonded together, which, in the normal, straight ahead position of the bogie as shown in the drawings and under at least one vehicle loading condition which lie with their compression axes C in line along the longitudinal centre line or axis L of the vehicle and bogie one on each side of the web 16 of the central member 15, have their outer end plates 27 bolted respectively flat against the surfaces 20 on the end members 19 and their inner end plates 26 bolted flat against the web 16.

Each spring has a length greater than the vertical height of its interleaves but somewhat less than their transverse width and, as may be noted from the drawings, five interleaves are provided for each spring. The two springs which in effect form one long spring restrained centrally against buckling normal to its compression axis by the member 15 are held in precompression initially by the bolts 22. Thus the springs are during assembly, first bolted in position between the central member 15 and the end members 19 which are drawn up by the bolts 22 to precompress the springs to an extent determined by the spacer sleeves 23. Thereafter the vehicle body is lowered on to the bogie and the end members 19 bolted to the transom brackets 21.

The bolts 22 may then be removed if desired but this is obviously immaterial and they are better left in place in case it becomes necessary to dismantle the device.

The drawings illustrate the condition of the control device under tare loading of the vehicle. The vehicle is assumed to include air levelling side bearers for maintaining the vehicle body at a predetermined height above the rails, for example as described in United States Patent 3,045,998 filed July 30, 1959 or 3,262,693 filed Sept. 1, 1964 each by A. J. Hirst and assigned to the assignor in the present case. FIGS. 4 to 6 show the longitudinal axis L of the vehicle and bogie with which the compression axes C of the interleaves rubber springs 25 are aligned, and also show the air levelling side bearers 50 for maintaining the vehicle body 9 at a predetermined height $x$ above the rails. The construction and operation of these side bearers 50 is fully described in said United States Patent 3,262,693. The bogie wheels are indicated at W.

Upon increase of loading, the central member 15 will be raised to a small extent relative to the bogie frame to account for the deflection of the axle box springs (not shown). This relative movement would be very small however and in consequence the compression axes C of the springs 25 will remain substantially horizontal throughout the load range.

The precompression in the springs 25 is selected to give rise to a zero stiffness for the control device in the vertical direction. The control device therefore neither assists nor loads the side bearers 50 in the vertical sense.

Because the transverse dimensions of the two springs 25 in the illustrated embodiment are greater than their vertical dimensions the springs are far more stable transversely than vertically. In consequence the control device provides a small positive transverse stiffness.

The precompression in the springs 25 also increases their compression stiffness and in the longitudinal direction of the control device, provides a very high stiffness for the transmission of traction and braking loads between the vehicle body 9 and the bogie frame 8.

The small angle of pivoting of the bogie is accommodated by the springs 25 without any significant stressing of the rubber.

The springs 25 making up the control device may be dimensioned and arranged due to their precompression to give rise to a negative stiffness for the control device in the vertical direction.

The side bearers 50 may be replaced by non-levelling, rubber spring side bearers. In this case the range of vertical movement between the body 9 and the bogie frame is increased. In the transverse direction the device comprising the springs 25 has a strongly non-linear characteristic, and this applies over a range of vertical deflection in the case of non-levelling bogies. The initial transverse rate may be made to increase with vertical deflection and may change from negative to positive in the process to compensate for a fall in horizontal stiffness in the side bearer assemblies. Even if stiffness in the side bearer assemblies have a constant horizontal stiffness some increase in the transverse resistance of the device may be useful to make the total transverse resistance roughly proportional to the vertical loading on the bogie.

The term "rubber" as used in this specification should be taken to include not only natural and synthetic rubbers, but also rubber-like materials.

I claim:

1. In a railway vehicle having a body mounted directly on a bogie frame by side bearers which transmit at least the main portion of the vertical load of the body to the bogie frame and which provide freedom for pivotal movements of the bogie relative to the vehicle body and in which control means is provided directly interconnecting the body and the bogie frame to transmit the traction and braking forces therebetween and to control relative longitudinal movement between the body and the bogie, the improvement which consists in that the control means comprises a pair of metal interleaved rubber springs which in the normal straight ahead position of the bogie relative to the vehicle body, and under at least one predetermined vehicle loading condition, lie with their compression axes in line along a longitudinal center line of the vehicle, one on each side of a central member, disposed centrally of the bogie, to which the adjacent inner ends of the two springs are rigidly connected, the outer ends of the springs being rigidly connected to further means and, of said central member and said further means, one is rigidly connected to the vehicle body and the other is rigidly connected to the bogie frame with the springs held in precompression between said further means and the central member, the transverse width of the spring being at least as great as their vertical depth and length dimension of the springs in the longitudinal direction of the vehicle being sufficiently great, compared with the vertical depth of the springs and the number of metal interleaves that, at said predetermined loading condition, due to the precompression in the springs, the control means has substantially zero vertical stiffness and accordingly is incapable of transmitting substantially any part of the vertical load of the vehicle body to the bogie frame.

2. A railway vehicle as claimed in claim 1 in which the side bearers are air-levelling side bearers operable to maintain the height of the vehicle body above the rail level at a predetermined value whereby the compression axes of the springs are maintained substantially in line along the longitudinal center line of the vehicle irrespective of the vehicle loading condition.

3. A railway vehicle as claimed in claim 2 in which the springs lie with their compression axes in line along the longitudinal center line of the vehicle under tare loading conditions of the vehicle.

4. A railway vehicle as claimed in claim 1 in which said central member is on the body and depends from the body to lie between a pair of longitudinally spaced, transversely extending transoms of the bogie frame to which the outer ends of the springs are connected, the central member lying also between and being spaced from longitudinally extending transversely spaced bogie frame members, the central member and the bogie frame members having cooperating buffer elements which limit the relative transverse movements of the central member and the bogie frame.

5. A railway vehicle as claimed in claim 4 in which the outer ends of the rubber springs are connected to end members which are in turn connected to the transoms and means is provided for holding the end members drawn together prior to their connection with the transoms thereby to precompress the rubber springs.

6. A railway vehicle as claimed in claim 5 in which the holding means is in the form of bolts with spacer sleeves thereon.

7. A railway vehicle as claimed in claim 1 wherein the length of said springs in the longitudinal direction of the vehicle is sufficiently great compared with the vertical depth of the springs and the number of metal interleaves that due to the precompression in the springs, the springs have a negative vertical stiffness.

8. A railway vehicle as claimed in claim 1 in which the rubber springs are composed of rubber pads and metal interleaves which have a width dimension, disposed in the horizontal transverse direction of the vehicle greater than their vertical depth.

9. A railway vehicle as claimed in claim 1 in which each of the rubber springs has a length greater than its vertical height but somewhat less than its transverse width.

References Cited

UNITED STATES PATENTS

| | | | |
|---|---|---|---|
| 2,877,749 | 3/1959 | Lich | 105—199 X |
| 2,954,747 | 10/1960 | Hirst et al. | 105—199 X |
| 3,045,998 | 7/1962 | Hirst | 105—199 X |
| 3,191,551 | 6/1965 | Hirst | 105—453 |

ARTHUR L. LA POINT, *Primary Examiner.*

H. BELTRAN, *Assistant Examiner.*